United States Patent [19]

Dieringer

[11] Patent Number: 4,513,214

[45] Date of Patent: Apr. 23, 1985

[54] DYNAMOELECTRIC MACHINE

[75] Inventor: Bruce G. Dieringer, Toledo, Ohio

[73] Assignee: Allied Corporation, Morristown, N.J.

[21] Appl. No.: 538,628

[22] Filed: Oct. 3, 1983

[51] Int. Cl.[3] .......................................... H02K 11/00
[52] U.S. Cl. ........................................ 310/71; 310/43;
310/89; 310/112; 310/239
[58] Field of Search ......................... 310/238–242,
310/243–247, 112, 88, 91, 89, 40 MM, 42, 43,
179, 71, 254, 180; 339/256 SP, 258 S, 101, 102 R

[56] References Cited

U.S. PATENT DOCUMENTS

| | | | |
|---|---|---|---|
| 2,230,581 | 2/1941 | Avigdor | 172/36 |
| 2,417,195 | 3/1947 | Hargreaves | 310/89 UX |
| 2,748,302 | 5/1956 | Boeckel | 310/247 |
| 2,804,559 | 8/1957 | Brewer | 310/89 |
| 3,089,047 | 5/1963 | Perzyk | 310/239 |
| 3,121,179 | 2/1964 | Macks | 310/90 |
| 3,143,677 | 8/1964 | Heiler | 310/239 |
| 3,159,763 | 12/1964 | Colvill | 310/238 |
| 3,182,218 | 5/1965 | Videtic | 310/239 |
| 3,269,322 | 8/1966 | Lotspih | 103/87 |
| 3,289,018 | 11/196? | Schaefer | 310/42 |
| 3,450,908 | 6/1969 | Mabuchi | 310/43 |
| 3,707,037 | 12/1972 | Gutris | 29/596 |
| 3,745,393 | 7/1973 | Spors | 310/239 |
| 3,982,146 | 4/1976 | Hokky | 310/89 |
| 4,056,749 | 11/1977 | Carlson, Jr. et al. | 310/239 |
| 4,086,753 | 5/1978 | Tsuchiya et al. | 58/23 D |
| 4,112,321 | 9/1978 | Wan | 310/242 |
| 4,127,785 | 11/1978 | Noguchi | 310/40 MM |
| 4,293,789 | 10/1981 | King | 310/71 |
| 4,322,647 | 3/1982 | Neroda et al. | 310/71 |
| 4,329,605 | 5/1982 | Angi | 310/239 |
| 4,342,929 | 8/1982 | Horne | 310/43 |
| 4,355,253 | 10/1982 | Vollbrecht | 310/239 |
| 4,414,481 | 11/1983 | de Jong | 310/89 |

FOREIGN PATENT DOCUMENTS

| | | | |
|---|---|---|---|
| 2340898 | 5/1974 | Fed. Rep. of Germany | 310/239 |
| 2037993 | 5/1981 | Fed. Rep. of Germany | 310/89 |

Primary Examiner—R. Skudy
Attorney, Agent, or Firm—J. P. DeClercq

[57] ABSTRACT

A dynamoelectric machine includes a two-part brush holding structure, allowing the part not exposed to high heat to be made from an inexpensive material. The two parts are assembled as a friction fit, and includes insulation-displacing connectors for terminating internal wiring and simultaneously providing external connections, some of the connectors protruding through the end bell. A boot member, which may be interchanged, and which sealingly passes a cable, is used to render the machine waterproof.

7 Claims, 10 Drawing Figures

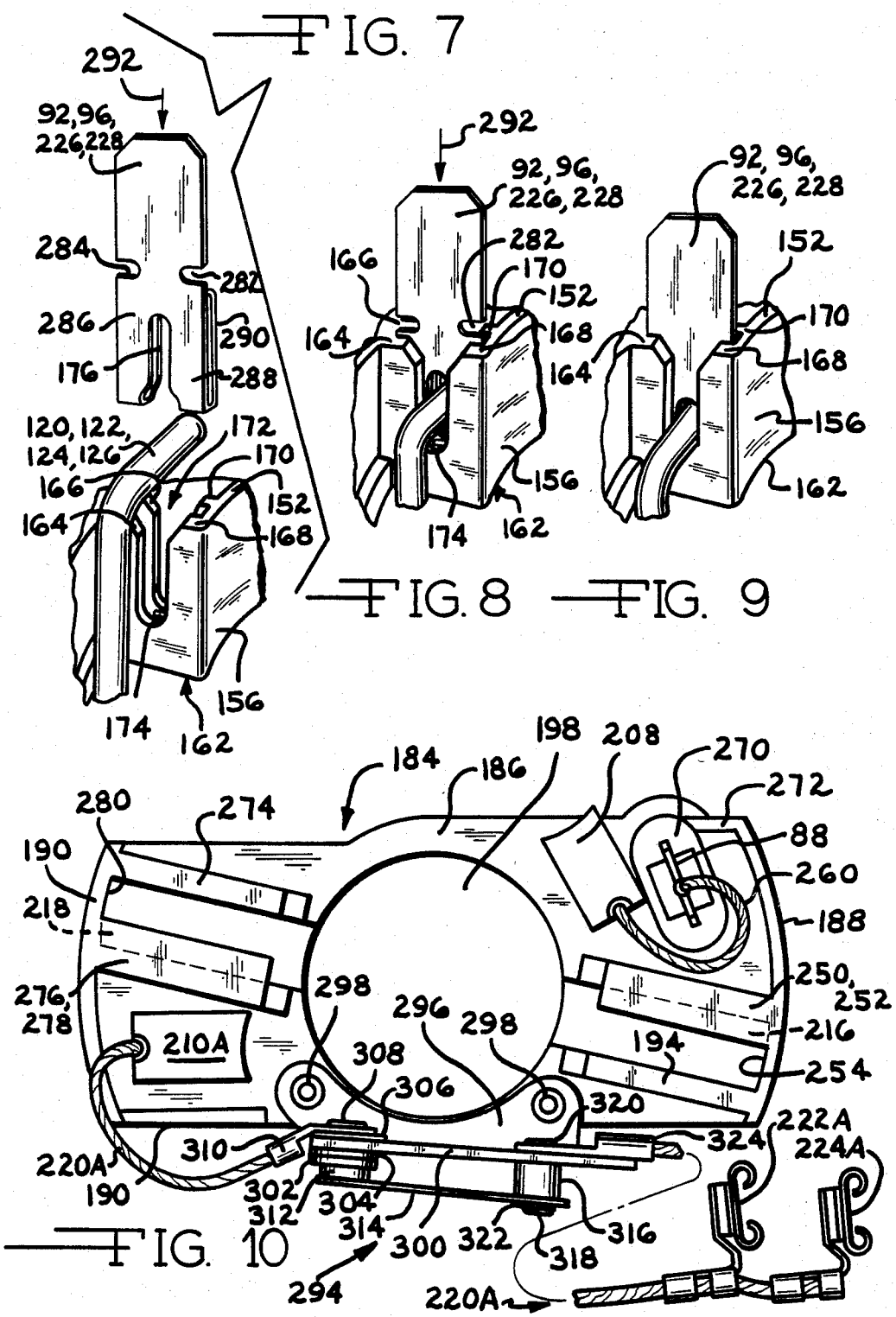

DYNAMOELECTRIC MACHINE

The instant application relates to the field of electromechanical energy conversion. In particular, the instant application relates to a waterproof dynamoelectric machine, having a novel two-part brush holder and a novel sealing boot structure.

BACKGROUND OF THE INVENTION

Numerous types and variations of dynamoelectric machines, such as motors, and generators, have been constructed. Each have included a stator portion and a rotor portion. The rotor portion, which is usually an armature, although it may also be a rotating field assembly, is provided with a contact surface such as a commutator or slip ring, and with brushes or the like for establishing electrical contact with the rotor. Brushes have been maintained in proper orientation in numerous different manners, and interconnections between brush leads and stator leads, in the case of wound stators, have been connected in numerous ways. In addition, motors have been made waterproof or water resistant, such as for use in submersible or marine applications in numerous ways. Also, terminal leads for conveying electrical energy to or from the machine have been connected to the machine in various ways. Connections between stator windings and brushes are conventionally made by stripping the wire or lead ends and splicing them together, although screw-and-nut interconnections have been also provided. Further, brush holding structures have been made in a fashion suitable for plugging into a terminal board terminating wiring from stator windings, for interconnecting stator windings and rotor windings, through the brushes. As will be apparent, such structures are expensive to produce, time-consuming to assemble, difficult to align, and inconvenient to service or repair.

Such dynamoelectric machines have been made waterproof or water resistant by providing a terminal box on the exterior of the machine, the box having a waterproof cover and an opening adapted to receive a sealing grommet or the like. After an appropriate electricl cable was passed through the sealing grommet, or itself provided with an appropriate sealing grommet, the wire ends were connected to those extending from the dynamoelectric machine into the connection box with splices, or with individually insulated nut and bolt connections. Also, external cables have been directly wired to stator windings and to brushes, and passed through a sealing grommet or the like in the housing of the dynamoelectric machine. As will be apparent, such a sealing grommet is not easily repositionable to adapt the dynamoelectric machine for different purposes or tasks.

Brush holding structures have been constructed in various ways, and typically include, at least in the case of smaller dynamoelectric machines, some type of mounting plate through which the rotor shaft passes, made of an insulating material, and brush guide tubes or slots, sometimes called brush boxes, made of conductive metal. The conductive metal is typically used for its temperature-resistant characteristics, rather than for its conductive characteristics, since the cumulative effect of the small energy loss between a brush and its contact surface causes considerable heating of the brush. It has also been proposed to mold a brush holder structure from a plastic material of the type which has a high temperature-withstanding capability. However, molding compounds for such use are considerably more brittle than molding compound for making items of a lower temperature-withstanding ability, requiring thick structures for strength. Also, materials with comparatively high strength and flexibility lack high-temperature withstanding ability.

The instant invention overcomes these and other deficiencies of the prior art.

SUMMARY OF THE INVENTION

The instant invention provides a dynamoelectric machine having numerous features usable in motors and generators, particularly in smaller sizes, whether or not adapted for submersible or marine applications, and whether or not permanently wired to conductors connecting the dynamoelectric machine to a source of electrical energy or to an electrical load.

It is a first object of the invention to provide a dynamoelectric machine having a molded two-part brush holding structure, the first part serving as a terminal board, and the second part serving to retain brushes or the like.

It is a feature of the invention that the terminal board part both serves to interconnect internal wiring, and to provide quick connect tabs for the connection of external wiring.

It is a further feature of the invention that the first part and second part of the two-part brush holding structure are frictionally interconnected.

It is a further feature of the invention that the first part of the brush holding structure may be molded from a material having a lower temperature-withstanding capability but greater strength and flexibility than the second part of the brush holding structure.

It is a further feature of the invention that the first part of the brush holding structure, serving as a terminal board, includes contact members including insulation-displacing portions for establishing internal interconnection within the dynamoelectric machine.

It is a further feature of the invention that the quick-connect tabs are surrounded by barrier walls which protrude through the end bell or cover of the dynamoelectric machine.

It is a further feature of the invention that the second part of the brush holding structure is unsymmetrical, and may be assembled to the first part only in a single relationship.

It is a first advantage of the invention that a molded brush holding structure may be made at a minimal thickness and weight, by using only a minimal amount more brittle of molding compound with high temperature-withstanding capability.

It is a further advantage of the invention that the first and second parts of the brush holding structure may be assembled without tools, and internal interconnection may be made with simple hand tools, in a fast and efficient manner.

It is a further advantage of the invention that external connection to the dynamoelectric machine may be easily established, using conventional quick-connect connectors.

It is a further object of the invention to provide a sealing boot covering the end of the dynamoelectric machine, for rendering the dynamoelectric machine waterproof, and having a connecting cable sealingly passing through the boot, and having terminal ends provided with quick-connect connectors.

It is a feature of the invention that the dynamoelectric machine is provided with an annular groove, and the boot is provided with an inwardly-directed annular protrusion adapted to be received in the annular groove, for sealing the dynamoelectric machine.

It is a first advantage of the invention that a boot and cable assembly may be easily and conveniently repositioned to fit various installation requirements of a dynamoelectric machine according to the invention. It is a further advantage of the invention that a variety of boot and cable assemblies, with cable entrance portions differently positioned, and with cables of various lengths, may be interchangeably used with a dynamoelectric machine according to the invention, to adapt it to a variety of uses.

Other objectives, features and advantages of the invention will become apparent from the detailed description which follows.

BRIEF DESCRIPTION OF THE DRAWINGS

FIGS. 7, 8 and 9 are partial perspective views illustrating the usage of insulation-displacing quick-connect terminals in the first part of the two-part brush holding structure of the invention.

FIG. 10 is a top plan view of the second part of the two-part brush holding structure according to the invention, further illustrating the provision of a bimetallic, temperature-responsive circuit breaker.

DETAILED DESCRIPTION OF THE INVENTION

Figure 1:
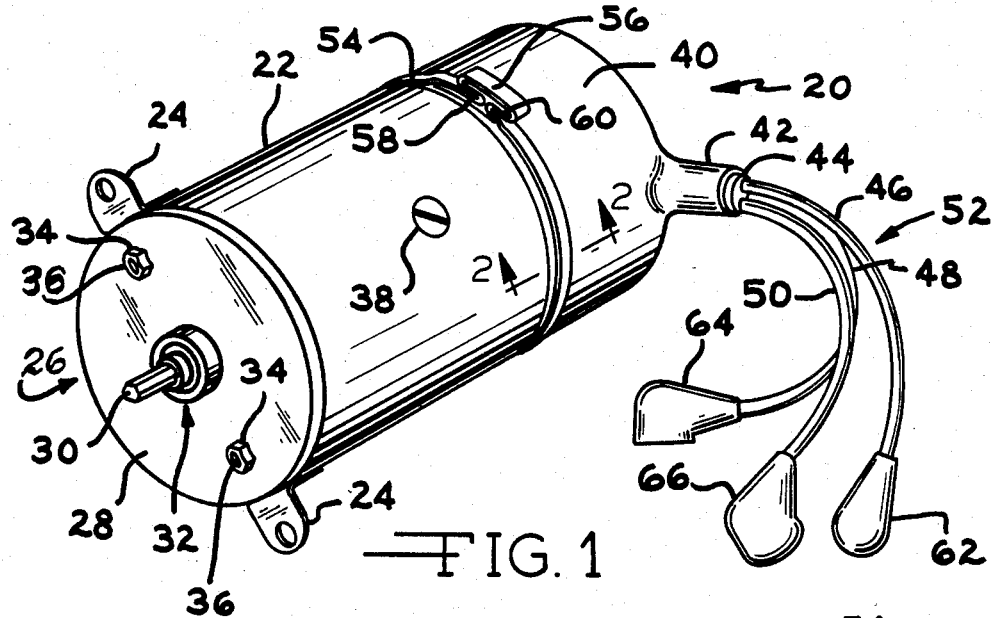
FIG. 1 is a perspective view of a dynamoelectric machine according to the preferred embodiment of the invention, in assembled configuration.

Turning first to FIG. 1, there is illustrated a dynamoelectric machine 20 according to the preferred embodiment of the invention. As illustrated, machine 20 includes a tubular housing member 22 with mounting brackets 24 adjacent a first end or drive end 26, which is closed by an end bell or cover 28. An output shaft 30 protrudes from end 26 through a bearing and seal assembly 32 of end bell 28. Nuts 34 are applied to through-bolts 36, in conventional fashion, to maintain dynamoelectric machine 20 in assembled relationship. Screw 38, passing through tubular housing member 22, serves to retain a field pole structure, in conventional fashion.

Dynamoelectric machine 20 includes at a second end of the housing member 22, a boot member 40, illustrated as being cup-like in shape, and having a tubular aperture 42 which, such as by means of seal means 44, sealingly passes conductors 46, 48 and 50, which together define a cable 52, which may be covered with a jacket member if desired. Boot member 40 is made of a material which is sufficiently resilient to be fitted over tubular housing member 22, and is secured to housing member 22 by a clamp 54. Clamp 54 may be of any type desired, but, in an actual embodiment of the invention, is of the type that is tightened by plastically deforming protruding portion 56 by squeezing it at end portions 58 and 60.

Cable 52 is shown provided with boots 62, 64, 66 covering terminals, not shown, of respective conductors 46, 48, 50.

Figure 2:
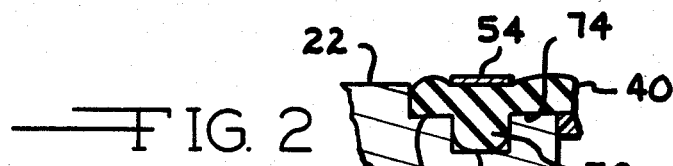
FIG. 2 is a partial sectional view taken along line 2—2 in FIG. 1.

Turning now to FIG. 2, it can be seen that housing member 22 includes an annular groove 68, and boot member 40 includes an inwardly directed annular flange 70 adapted to be received in groove 68, and that clamp 54 retains flange 70 in groove 68. As can also be seen, housing member 22 includes recessed portions 72 and 74 on opposite sides of annular groove 68, substantially equal in depth to the thickness of boot member 40, so that boot member 40 will not protrude radially beyond the outer surface of tubular housing member 22. Recessed portions 72 and 74 are not necessary to practice the invention.

Figure 3:
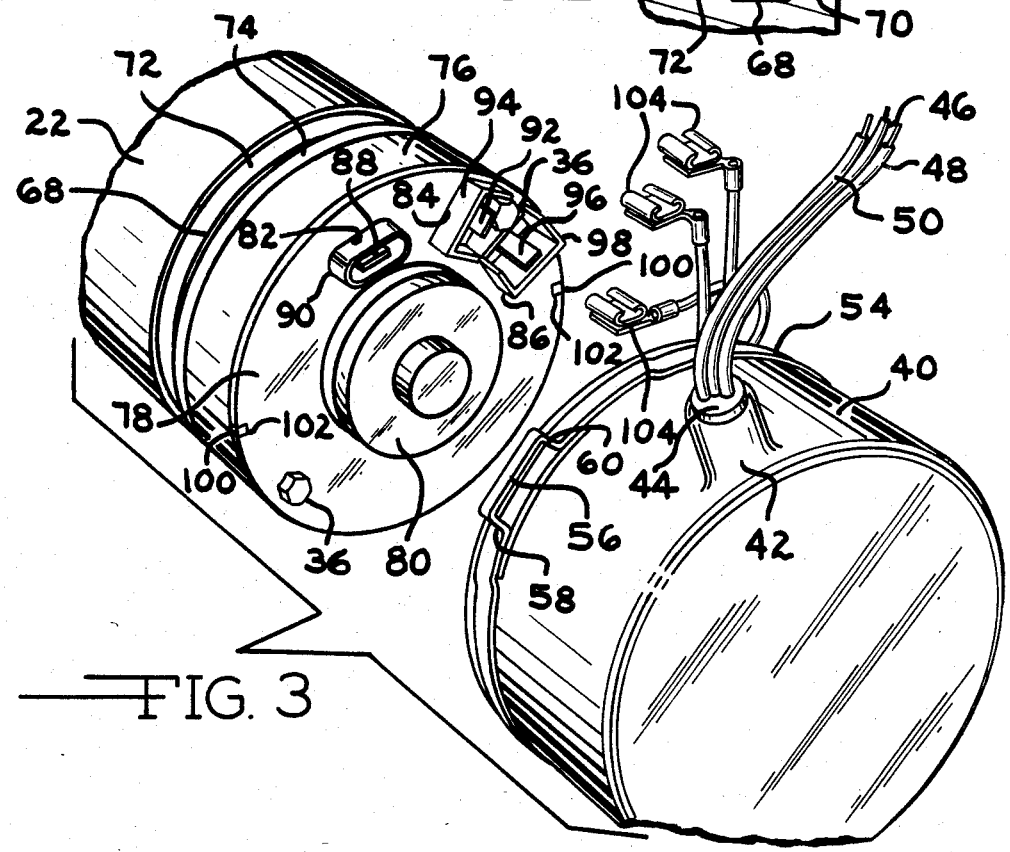
FIG. 3 is a perspective view illustrating the blind end of a dynamoelectric machine according to the invention disposed adjacent a boot member, prior to assembly.

Turning now to FIG. 3, it can be seen that the first member of the two member brush holding structure according to the invention, first circular member 76, is interposed between tubular housing member 22 and blind-end bell or cover 78. Also, as will become apparent from the figures which follow, the second member 184 of the two member brush holder is also interposed between housing member 22 and end bell 78. End bell 78 includes a bearing pocket portion 80, which, as will be apparent, contains a bearing, not shown, for supporting one end of a rotor or armature shaft, not shown.

The illustrated embodiment of the invention is a reversible series machine, and, therefore, has external access to oppositely-wound field coils or the like. The illustrated structure may also be used in a machine having two or three individually-selectable field flux levels, such as by double-winding field coils, so that the first winding, the second winding, or both windings together may be connected to a source of electrical energy or to an electrical load. As will be apparent, shunt or compound machines may also be constructed using the illustrated structure, or a variation of the illustrated structure in which one or more of the external connections illustrated may be eliminated.

As illustrated, end bell 78 includes three apertures, an aperture 82, illustrated as elongated, and apertures 84 and 86, illustrated as rectangular. A first quick-connect terminal 88 protrudes through aperture 82, and is isolated from end bell 78 by an elongated barrier wall 90. As will become apparent, in the illustrated embodiment of the invention, barrier wall 90 is member 184 of the second member of the two-part brush holder of the instant invention, and first terminal 88 is connected to a brush of the dynamoelectric machine 20. A second quick-connect terminal 92 protrudes through aperture 84, and is isolated from aperture 84 by a rectangular barrier wall portion 94. Likewise, a third quick-connect terminal 96 protrudes through aperture 86, and is isolated from end bell 78 by a rectangular barrier wall portion 98. As will become apparent below, terminals 92 and 96 are connected to individual field windings of dynamoelectric machine 20, and barrier walls 94 and 98 may be either part of first circular member 76 or may be separately provided. Preferably, they are separately provided. In the preferred embodiment of the invention, they are separate pieces, with an appropriate flange to retain them in apertures 84, 86, and having a narrow slot for receiving terminals 92, 96. Separate barrier wall portions have been found desirable in that they may be used to reduce the gaps around terminals 92, 96. Constructing barrier walls 94, 98 integral with first circular member 76 results in larger gaps, due to the necessity for inserting terminals 92, 96 into their respective positions. The advantage obtained by using separate barrier wall portions is that dynamoelectric machine 20 may be made explosion-proof for marine use with boot member 40 not installed.

As illustrated, barrier walls 94 and 98 are cut away at one side to allow convenient access to the head of a through-bolt 36. Also, as illustrated, a projection 100 from first circular member 76 cooperates with a notch 102 at the edge of end bell 78, for convenience in assembly.

Each of the conductors 46, 48, 50 is provided with a female quick-connect terminal 104. Thus, as can be seen, a boot member 40 having a configuration other than as illustrated, or conductors of lengths other than as illustrated may be substituted for the illustrated assembly, so that dynamoelectric machine 20 may be used for a variety of purposes without modification of the remainder of the illustrated structure.

Figure 4:
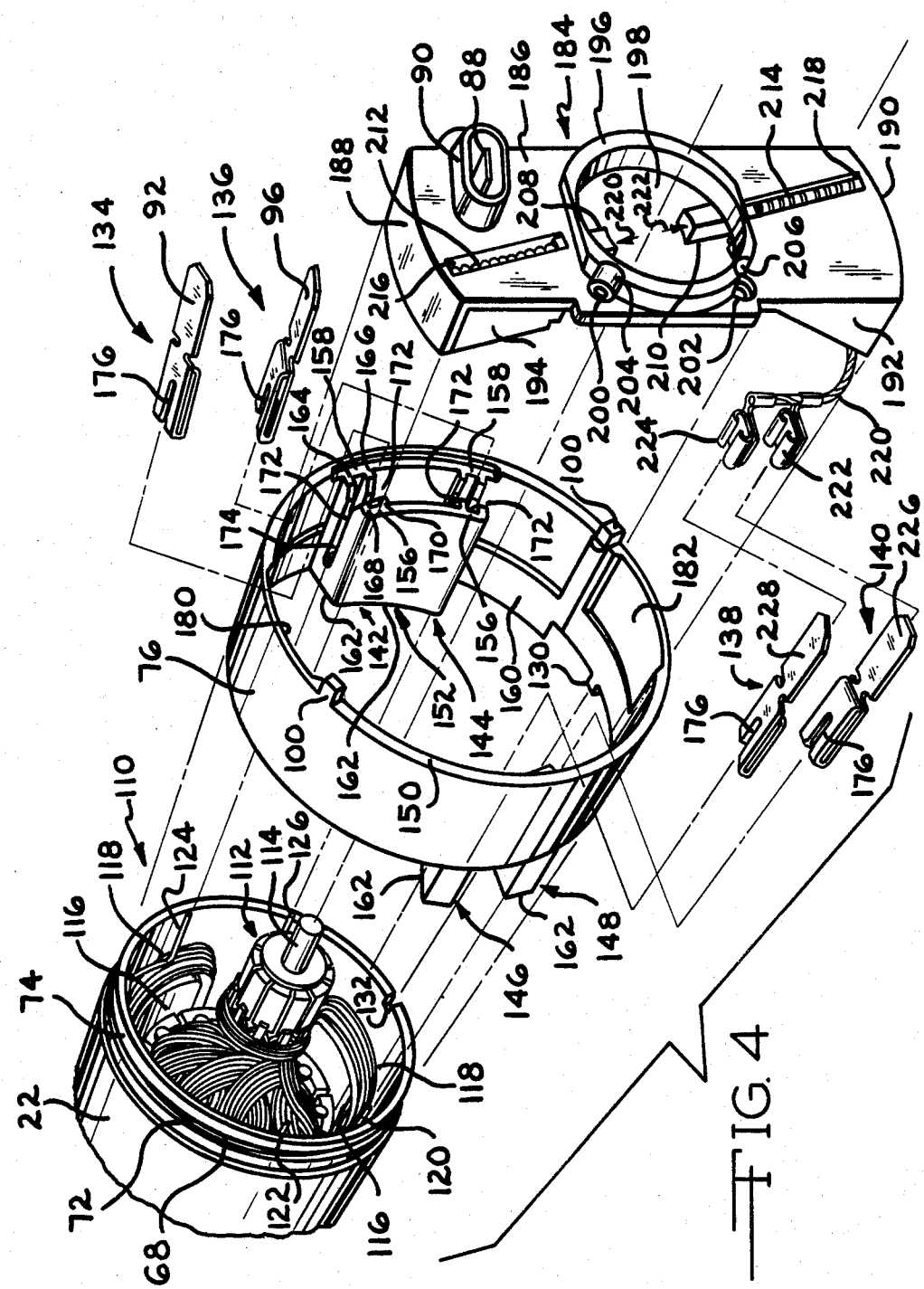
FIG. 4 is an exploded perspective view, illustrating the two-part brush holder structure according to the invention.

Turning now to FIG. 4, it can be seen that dynamoelectric machine 20 includes at the second end a rotor in a form of a conventional armature assembly 110, illustrated as being of the flyer-wound type, and having a contact surface shown as a commutator 112, and a shaft 114. The stator of dynamoelectric machine 20 includes appropriate field poles 116 provided with field windings 118. As shown, windings 118 include four terminal ends, ends 120, 122, 124 and 126. As illustrated, there are two coils 118, each having a single winding, having two terminal ends.

Circular member 76, as illustrated, has a cylindrical outer surface, and, as shown, includes projections 100 for aligning end bell 78, and a projection 130 for cooperating with a notch 132 in housing member 22 for aligning and preventing relative rotation of circular member 76.

Also, as shown, circular member 76 includes a plurality of pocket portions for receiving a number of contact members appropriate for the number of winding ends to be terminated. As illustrated, there are four contact members, contact members 134, 136, 138 and 140, respectively received in pocket portions 142, 144, 146 and 148. Pocket portions 142, 144, 146 and 148 are functionally identical, pocket portions 146 and 148 being set back from surface 150, which contacts end bell 78 in assembled configuration, and extend into housing member 22, since contact members 138 and 140 are intended for internal interconnection purposes, rather than external connection purposes, and thus, in the illustrated embodiment of the invention, do not extend through end bell 78. As will be apparent, circular member 76 may easily be modified to provide external connection to as many internal components as desired.

Pocket portions 142 and 144, and pocket portions 146 and 148 are each connected by a connecting portion 152, and are otherwise identical in structure except for axial positioning. Each pocket portion includes a first end portion 156 and a second end portion 158. Portions 156 are illustrated as integral with connecting portion 152, end portions 158 are illustrated as integral, at least in part, with interior surface 160 of circular member 76. Each pocket portion also includes a bottom portion 162. Side portions 164 and 166 extend from end portion 158, and side portions 168, 170 extend from end portion 156. Wire receiving slots 172, with beveled entry portions are defineld between side portions 164 and 168, and between side portions 166 and 170. Bottom portion 162 includes a wire-supporting projection 174.

Each contact member 134, 136, 138, 140 includes an insulation-displacing slot 176, which engages a wire placed through slot 172 and upon projection 174 to establish electrical connection with the wire, such as terminal ends 120, 122, 124, 126 of wires forming field windings in the illustrated embodiment of the invention.

Inner surface 160 of circular member 76 includes first and second recesses 180, 182, for receiving the second member of the two member brush holder of the instant invention, second elongated member 184. The elongated member 184 is fabricated from a high temperature-withstanding plastic material which is generally more brittle than the material of circular member 76. The material of circular member 76 is a high strength flexible plastic material and need not have the high temperature-withstanding capability of elongated member 184. As illustrated, elongated member 184 includes a substantially planar elongated portion 186 having a first arcuate end portion 188 disposed perpendicularly to portion 186, and a second arcuate end portion 190, also disposed perpendicularly to portion 186. Portions 188 and 190 are reinforced by various portions of member 184, such as the structure of the brush holding portions, to be described in detail below. As illustrated in FIG. 4, a generally-triangular reinforcing portion 192 is part of the reinforcement of second arcuate end portion 190, and end portion 188 is reinforced by a wall portion 194, which, as will appear below, is part of the structure which serves as means for retaining brushes. Planar elongated portion 186 is shown as stiffened and reinforced by a generally ring-shaped reinforcing member 196, surrounding central aperture 198, which is substantially centered between arcuate end portions 188 and 190, and through which armature shaft 114 protrudes. Also, as illustrated, apertures 200 and 202 are provided in planar portion 186, for receiving rivets for retaining a circuit breaker, if desired. To provide clearance for the heads of rivets passing through apertures 200, 202, clearance portions 204 and 206, respectively, are defined in ring-shaped reinforcing member 196. In one actual embodiment of the invention, utilizing a circuit breaker, apertures 200 and 202 were not provided, but rather a pair of pins were provided at the illustrated position, extending from portion 186 in the direction of portions 192 and 194, to which a circuit breaker may be retained in any convenient fashion.

Member 184 retains the brush means including brushes 208, 210, which are urged towards commutator surface 112 by resilient means shown as helical springs 212, 214, respectively, which are visible in the illustration of FIG. 4 through respective slots 216, 218 defined in planar portion 186. As will become apparent, slots 216, 218 are provided for convenience in molding the portion of the structure which retains brushes 208, 210, and do not serve a function in the operation of the invention as illustrated. As will be apparent to one skilled in the art, the assembly of the machine as illustrated and described to this point is quite simple and uncomplicated since, as can be seen, brushes 208, 210 are easily accessible for urging in the direction of respective arrows 220, 222, so that commutator surface 112 may be placed between brushes 208 and 210.

Also, as will be described in greater detail below, first recess 180 receives first arcuate end portion 188, and second recess 182 receives second arcuate end portion 190. As will be described in greater detail below, recesses 180, 182, and end portions 188, 190 are so configured that member 184 may be inserted into member 76 only in the position illustrated, neither reversed or inverted, facilitating the assembly of the instant invention, since wires and the like may be cut to precise length, without waste, and with the assurance that the structure of the invention will be assembled without error at the first attempt.

As can be seen, elongated barrier wall 90 is integral with portion 186, and protrudes in the same direction as ring-shaped reinforcing member 196.

Also, as illustrated, brush 210 is provided with a lead wire 220, which is provided with a pair of female quick-connect terminals 222, 224, which cooperate with respective terminal portions 226, 228 of contact members 138, 140. This structure in effect interconnects ends of field coils without the necessity for splices or jumpers, as had heretofore been provided, thus further simplifying the assembly of the invention.

Figure 5:
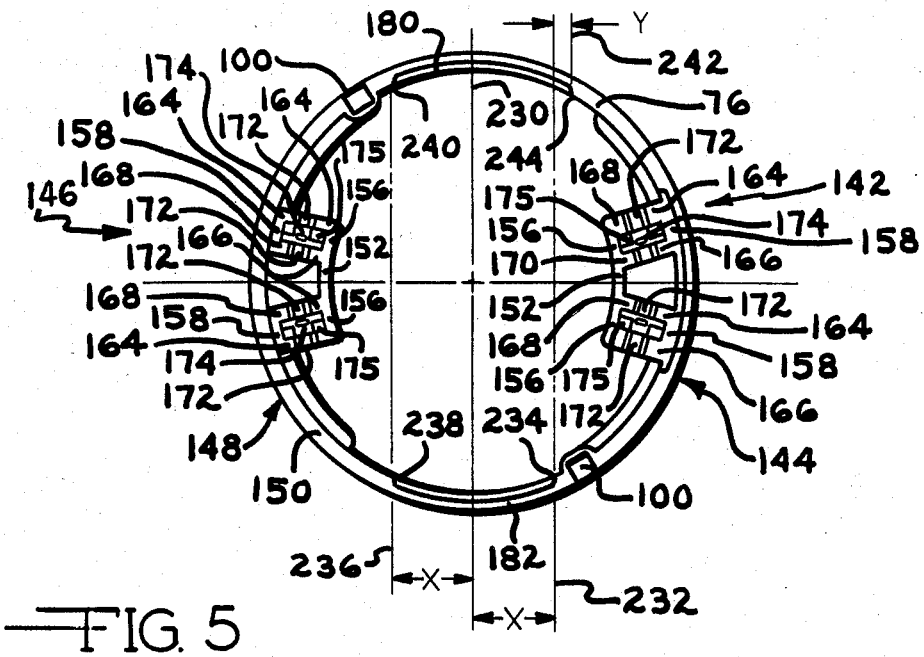
FIG. 5 is a top elevational view, illustrating the first part of the two-part brush holding structure according to the invention.

Turning now to FIG. 5, a planar view of circular member 76, some of the features which yield the advantages of the invention may be seen in greater detail. As clearly illustrated, recesses 180 and 182 are unsymmetrical with respect to diameter 230. In the embodiment illustrated, line 232, with which first end 234 of recess 182 is aligned, and line 236, with which second end 238 of recess 182 and first end 240 of recess 180 are aligned are both spaced a distance X from diameter 230, while line 242, with which second end 244 of recess 180 is aligned, is at a distance X+Y from diameter 230. Of course, end portions 188 and 190 match the recesses 180, 182 into which they are received, when correctly oriented. As will now be apparent, of the four possible positions in which member 184 may be oriented with respect to member 76, only one will permit assembly. Assembling these two components is a simple task, since member 184 is simply frictionally received in recesses 180, 182, and may be installed with finger pressure. As may be seen, it will be retained in place when end bell 78 is in assembled position.

Figure 6:
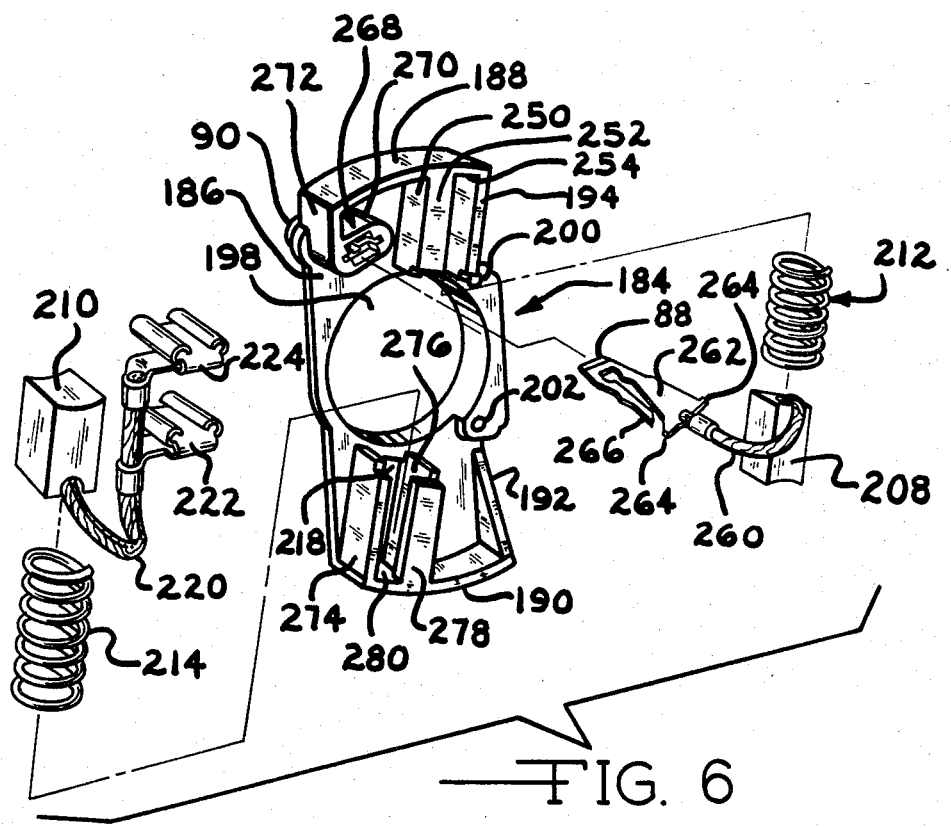
FIG. 6 is an exploded perspective view illustrating the second part of the two-part brush holding structure according to the invention.

Turning now to FIG. 6, an exploded perspective view of member 184 and the devices it supports is shown. As can be seen, the structure which retains brushes 208, 210 and supports first quick-connect terminal 88 also serve to reinforce member 184. As can be seen, brush 208 and spring 212 are retained in a box-like structure formed by wall portion 194, integral with end portion 188 and planar elongated portion 186, a wall portion 250 parallel to wall portion 194 also integral with portions 186 and 188, and overhanging portion or retaining edge 252 perpendicular to wall portion 250 and integral with wall portion 250 and portion 188, and parallel to planar elongated portion 186. Spring 212 bears against inner surface 254 of end portion 188.

As illustrated, brush 208 is provided with a lead wire 260, which connects it to first quick-connect terminal 88. As illustrated, terminal 88 has a body portion 262, a shoulder portion 264, and a cantilevered latching portion 266. Terminal 88 is inserted into a socket means having an opening 268 in projection 270, which projects from planar portion 186 in the same direction as walls 194, 250. Latching portion 266 cooperates with shoulders, not visible in FIG. 6, to retain terminal 88 in opening 270 and projecting into the area enclosed by elongated barrier wall 90. A reinforcing wall portion 272 extends between projection 270 and end portion 188, and is integral with portion 188, portion 186, and projection 270.

Brush 210 and spring 214 are retained in the same manner as brush 208 and 212, in a space defined by a wall portion 274 perpendicular to portion 186 and integral with portion 186 and end portion 190, a wall portion 276 parallel to wall portion 274 and integral with portion 186 and end portion 190, and overhanging portion 278 perpendicular to wall portion 276 and integral with wall portion 276, end portion 190 and planar portion 186. Spring 214 bears against an inner surface 280 of end portion 190.

Referring now to FIGS. 7, 8 and 9, it can be seen how a machine according to the invention is interconnected without the necessity of soldering, brazing or splicing. It will become apparent that the material forming pocket portions 142, 144, 146, 148 must be of a high strength flexible material to withstand the making of the interconnections. As can be seen, terminals 92, 96, 226, 228, which are commercially available, include notches 282, 284 at side portions thereof, and define leg portions 286, 288, which define insulation-displacing slot 176. Terminals 92, 96, 226, 228 include a folded-back portion 290, which provides two insulation-displacing edges for slot 176, and also define a latching tab, not visible, adjacent notches 282, 284. To terminate a terminal end 120, 122, 124, 126, it is placed in slot 172, and a quick-connect terminal such as 92, 96, 226, 228 is pushed in the direction of arrow 292 between side portions 164, 168 and 166, 170 until notches 282, 284 are no longer visible. Thus, the terminal end supported on portion 174 will be pushed into slot 176, and make electrical connection with the quick-connect terminal. As will be apparent, bottom portion 162 includes a pair of apertures, not shown, for receiving leg portions 286, 288 therethrough.

Turning now to FIG. 10, an alternate embodiment of the invention, in which a circuit breaker is provided, is illustrated. As will become apparent, there are minor differences in interconnection when a circuit breaker is provided. In FIG. 10, a circuit breaker 294 is shown interposed between a brush 210A and quick-connect terminals 222A, 224A. As shown, circuit breaker 294 includes a base portion 296 fastened to planar portion 186 by rivets 298 at the locations of apertures 200, 202, and an integral supporting portion 300 perpendicular to portion 296. Circuit breaker 294 includes a fixed contact 302, electrically isolated from supporting portion 300 by insulating washers 304, 306, at least one of which is a shoulder washer. Fixed contact 302 has a mounting stud which is riveted at head portion 308 to retain a ring terminal 310 which is fastened to brush lead 220A. Moveable contact 312 is fastened to a bimetallic element 314, which is mounted to supporting portion 300, and spaced from portion 300 by a spacer member 316. A rivet, headed at head portions 318 and 320 retains spacer member 316, bimetallic element 314, and a resilient washer 322, which is placed under head portion 318. Resilient washer 322 is provided to avoid stress concentrations in bimetallic element 314 when it bends. Head portion 320 also retains a ring terminal 324, connected to lead wire 220A.

In view of the detailed description above, several modifications will be immediately apparent to one skilled in the art. Various types of machines require various obvious types of field coils, internal interconnection, and external connection provisions. For instance, a permanent magnet field dynamoelectric machine with a grounded frame, although not making use of all the features and advantages of the invention, would have only a single externally-projecting terminal, such as terminal 88. A non-reversible, series-connected dynamoelectric machine would have two externally-projecting terminals, such as terminals 88 and 92. A balanced-series connected dynamoelectric machine would have two externally-projecting terminals, such as terminals 92 and 96. This configuration is often used for reduced radial-frequency interference generation. A series-connected, reversible, dual torque constant dynamoelectric machine would require four externally-projecting terminals, such as terminals 88, 92, 96 and 226. Also, a compound-connected dynamoelectric machine would require two externally-projecting terminals such as terminals 92 and 96.

Thus, as will be seen, the instant invention provides a dynamoelectric machine which may be assembled without soldering or splicing, which includes a two-part brush holder which may be assembled without tools and cannot be incorrectly oriented, and which is made light, strong and temperature-resistant since brittle high temperature resistant plastic materials are not used where not necessary, and plastic materials of high strength and flexibility are not used where not necessary and in which internal interconnection and external connection provisions are simultaneously made, and which may be made waterproof by the installation of an interchangeable boot. Numerous modifications and variations of the preferred embodiment of the invention, and of the novel features illustrated, will be apparent to one skilled in the art, and may be easily made without departing from the spirit and scope of the invention.

I claim:

1. A dynamoelectric machine, comprising:

a tubular housing member having a first end and a second end;

field windings disposed within said housing member;

armature means including a shaft having a shaft extension portion and a commutator surface;

brush means adapted to be in electrical contact with said commutator surface;

said first end of said housing member being a closed end and having said shaft extension portion passing therethrough and rotatably supported thereby;

said commutator surface being disposed adjacent said second end;

means for making electrical connection to said commutator surface and to said field windings disposed adjacent said second end;

said means for making electrical connection including a first circular member and a second elongated member;

said first circular member having a generally circular outer periphery including projection means for engaging an end surface of said tubular housing member, and an inner radial periphery including at least one inwardly projecting pocket portion for receiving supporting insulation displacing contact means for making electrical connection with said field windings and with said brush means, and further including first and second opposing arcuate recesses, said first recess being arcuately longer than said second recess, said first and second recesses being adapted to retain said second elongated member;

said first arcuate recess having a first end and said second arcuate recess having a second end, said first end and said second end being equally spaced in the same direction from a diameter of said first circular member to prevent incorrect orientation of said second elongated member;

said second elongated member including a first arcuate end portion adapted to be received in said first arcuate recess and a second arcuate end portion adapted to be received in said second arcuate recess;

said second elongated member defining an aperture therethrough, said aperture being centered between said first arcuate end portion and said second arcuate end portion for receiving said armature shaft therethrough;

said second elongated member further defining means for retaining said brush means in electrical contact with said commutator surface;

said second elongated member having a planar portion and first and second arcuate wall portions adjacent said respective first and second arcuate wall portions adjacent said respective first and second arcuate end portions, said wall portions being traverse to said planar portion and extending in a first direction therefrom;

said means for retaining said brush means each including a first radially-disposed wall portion extending from said planar portion in said first direction, a second wall portion parallel to said first wall portion and spaced therefrom and including a retaining ledge portion extending parallel to said planar portion and towards said first wall portion;

each said brush means being retained between said first and second wall portions and between said planar portion and said retaining ledge portion;

said brush means including a brush and a brush spring between each said brush and one of said first and second arcuate wall portions to urge said brush towards said commutator surface;

said second elongated member further including means for supporting a second electrical contact means connected to one said brush;

an end bell disposed adjacent said means for making electrical connection and rotatably supporting said armature shaft;

said second elongated member being disposed between said second end of said housing member and said end bell;

said second electrical contact supported by said second elongated member and said contact means supported by said inwardly projecting pocket portion of said first circular member passing through apertures in said end bell;

said tubular housing member defining an annular groove adjacent said second end;

a boot member enclosing said second end of said housing member, said boot member being provided with an inwardly directed annular flange adapted to be disposed in said annular groove to seal said boot member to said housing member;

said boot member further defining a tubular aperture for sealingly passing at least two electrical conductors each said conductors being provided with connector means adapted to be received on one of said insulation displacing contact means and said second electrical contact; and a clamp being applied to said boot member adjacent said annular flange to retain said boot member to said housing member.

2. A dynamoelectric machine, comprising:

a housing member;

a stator having at least a pair of field poles and associated field windings, each winding having a start winding lead wire and a finish winding lead wire extending therefrom;

armature assembly including an armature contact surface disposed within said housing member;

at least two brushes having lead wires electrically connected thereto, said brushes biased into electrical contact with said armature contact surface; and brush holding structure for said brushes, said structure disposed adjacent one end of said housing;

said brush holding structure including a first member and a second member;

said first member being molded of a first plastic material and said second member being molded of a second plastic material having a higher temperature resistance characteristic than that of said first plastic material;

said first member including at least two recesses in an inner surface thereof for receiving said second member and at least one inwardly projecting pocket portion means for receiving a first contact terminal electrically connected to one of said wires extending from said field winding;

said second member being adapted to be received in said recesses and substantialy within said first member and including means for retaining said brushes and socket means for receiving a second contact terminal attached to one of said lead wires of said brushes.

3. A dynamoelectric machine according to claim 2 additionally including:

an end bell adapted to be connected to said brush holding structure opposite said one end of said housing member, said brush holding structure being disposed between said housing member and said end bell.

4. A dynamoelectric machine according to claim 3 wherein said first and second contact terminals protrude through apertures defined in said end bell for making electrical connection to said brush and said field winding.

5. A dynamoelectric machine according to claim 4 wherein said housing member includes an angular groove defined therein adjacent said brush holding structure and further including:

a boot member provided with an inwardly directed annular flange adapted to be disposed in said angular groove to seal said boot member to said housing member;

said boot member defining a tubular aperture for sealingly passing at least one conductor having a connector means adapted to be connected to one of said first and second contact terminals; and clamp means being applied to said boot member adjacent said annular flange to securely retain said boot member to said housing member.

6. A dynamoelectric machine according to claim 2 wherein said recesses include a first and second opposed arcuate recesses wherein said first recess is arcuately longer than said second recess; and said second member includes a first arcuate end portion adapted to be disposed in said first recess and a second arcuate end portion adapted to be disposed in said second recess where said first arcuate end portion is arcuately longer than said second arcuate end portion.

7. A dynamoelectric machine according to claim 2 wherein said housing member includes an angular groove defined therein adjacent said brush holding structure, and further including:

a boot member provided with an inwardly directed annular flange adapted to be disposed in said angular groove to seal said boot member to said housing member;

said boot member defining a tubular aperture for sealingly passing at least one conductor having connector means adapted to be connected to one of said first and second contact terminals; and clamp means being applied to said boot member adjacent said annular flange to securely retain said boot member to said housing member.

* * * * *